(12) United States Patent
Schneider et al.

(10) Patent No.: US 12,077,065 B2
(45) Date of Patent: Sep. 3, 2024

(54) BRAKE CONTROL SYSTEM FOR BATTERY-POWERED MACHINE

(71) Applicant: Caterpillar Global Mining Equipment LLC, Tucson, AZ (US)

(72) Inventors: Karl P Schneider, Decatur, IL (US); Cameron Thomas Lane, Oro Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 224 days.

(21) Appl. No.: 17/537,420

(22) Filed: Nov. 29, 2021

(65) Prior Publication Data
US 2023/0166601 A1    Jun. 1, 2023

(51) Int. Cl.
*B60L 7/26* (2006.01)
*B60T 7/12* (2006.01)
*B60T 8/17* (2006.01)

(52) U.S. Cl.
CPC ......... *B60L 7/26* (2013.01); *B60T 7/12* (2013.01); *B60T 8/17* (2013.01); *B60T 2201/02* (2013.01); *B60T 2210/20* (2013.01); *B60T 2220/04* (2013.01); *B60T 2250/04* (2013.01); *B60T 2270/604* (2013.01)

(58) Field of Classification Search
CPC ...... B60L 7/26; B60L 7/10; B60L 7/22; B60L 15/2045; B60T 17/12; B60T 8/17; B60T 2201/02; B60T 2210/20; B60T 2220/04; B60T 2250/04; B60T 2270/604; B60T 1/10
USPC .......................................................... 701/70
See application file for complete search history.

(56) References Cited

U.S. PATENT DOCUMENTS

| 7,841,433 B2 | 11/2010 | Soliman et al. |
| 8,360,343 B2 | 1/2013 | Gudat et al. |
| 8,543,272 B2 | 9/2013 | Yu et al. |

(Continued)

FOREIGN PATENT DOCUMENTS

| CN | 103991384 B | 8/2014 |
| CN | 103818264 B | 3/2016 |

(Continued)

OTHER PUBLICATIONS

Written Opinion and International Search Report for Int'l. Patent Appln. No. PCT/US2022/080297, mailed Apr. 11, 2023 (9 pgs).

*Primary Examiner* — Yi-Kai Wang

(57) ABSTRACT

A brake controller of a machine can be configured to determine brake power associated with braking operations, such as operations to slow the machine or maintain a speed of the machine. The brake controller can allocate the brake power among systems such as a battery system, a resistive grid, auxiliary systems, a mechanical brake system, and/or other systems, based on a defined priority order of the systems. For example, the brake controller can prioritize using a regenerative brake system to charge a battery system during a braking operation up to a currently-available capacity of the battery system, and allocating any remaining brake power to a lower-priority system. The mechanical brake system can be the lowest-priority system, such that use of the mechanical brake system can be avoided unless an amount of brake power exceeds capacities of higher-priority systems to consume the brake power.

20 Claims, 4 Drawing Sheets

(56) References Cited

U.S. PATENT DOCUMENTS

| | | | |
|---|---|---|---|
| 8,983,657 | B2 | 3/2015 | Jacobson |
| 8,983,675 | B2 | 3/2015 | Dawson et al. |
| 9,283,954 | B2 | 3/2016 | Dalum |
| 9,545,854 | B2 | 1/2017 | Daum et al. |
| 9,669,821 | B1 | 6/2017 | Laing |
| 9,805,317 | B2 | 10/2017 | Gudat et al. |
| 10,696,164 | B2 | 6/2020 | Zhao et al. |
| 10,753,761 | B2 | 8/2020 | Ricci |
| 10,787,092 | B2 | 9/2020 | Hou et al. |
| 10,800,398 | B2 | 10/2020 | Duan et al. |
| 10,836,371 | B1 | 11/2020 | Thiruvengadam et al. |
| 10,882,399 | B2 | 1/2021 | Koebler et al. |
| 10,946,764 | B2 | 3/2021 | Morimoto et al. |
| 2011/0311894 | A1 | 12/2011 | Schaffnit |
| 2014/0114514 | A1 | 4/2014 | Crombez et al. |
| 2016/0311423 | A1* | 10/2016 | Storm ................. B60L 50/40 |
| 2016/0318501 | A1* | 11/2016 | Oldridge ............ B60W 20/12 |
| 2017/0021737 | A1* | 1/2017 | Park .................... B60L 58/12 |
| 2017/0072932 | A1* | 3/2017 | Steward .............. B60T 17/22 |
| 2017/0282889 | A1* | 10/2017 | Books ................ B60K 6/448 |
| 2018/0060776 | A1 | 3/2018 | Ahmed et al. |
| 2018/0204161 | A1 | 7/2018 | Sandulescu et al. |
| 2019/0344777 | A1 | 11/2019 | Ourabah et al. |
| 2020/0017043 | A1* | 1/2020 | Kato .................... B60L 58/32 |
| 2020/0122728 | A1 | 4/2020 | Murase |
| 2021/0197672 | A1* | 7/2021 | King .................... B60L 7/14 |

FOREIGN PATENT DOCUMENTS

| | | |
|---|---|---|
| CN | 107117038 B | 9/2017 |
| CN | 10979537 A | 5/2019 |
| CN | 109878355 A | 6/2019 |
| CN | 111366211 A | 7/2020 |
| CN | 111907335 A | 11/2020 |
| EP | 0640503 | 3/1995 |
| JP | 2006333549 A | 12/2006 |
| JP | 2012147636 A | 8/2012 |
| JP | 2017154693 A | 9/2017 |
| KR | 101526430 B1 | 6/2015 |
| WO | WO-2019163052 A1 * | 8/2019 |
| WO | WO2019210745 A1 | 11/2019 |
| WO | WO2020199873 A1 | 10/2020 |

* cited by examiner

BRAKE CONTROL SYSTEM FOR BATTERY-POWERED MACHINE

TECHNICAL FIELD

The present disclosure relates to battery-powered electric machines and, more particularly, to managing energy associated with braking systems of a machine.

BACKGROUND

Electric machines, such as vehicles or other mobile machines, that are at least partially powered by on-board batteries can be environmentally-friendly alternatives to machines powered by fossil fuels. The state of charge (SoC) of a battery of a machine can vary over time, for instance as the battery is charged or discharged. For example, the battery can be charged when the machine is connected to a charging station or other external power source, and/or when a regenerative braking system captures energy during braking operations of the machine. Some operations of the machine, such as operations to propel movement of the machine, can consume energy stored in the battery, and thereby discharge the battery.

Various systems have been developed to manage usage of a regenerative braking system that can charge a battery of a machine. For example, U.S. Patent Application Pub. No. 2020/0122728 to Murase (hereinafter "Murase") describes a brake control device for a vehicle that includes a regenerative brake system and a hydraulic brake system that applies friction during braking operations of the vehicle. The brake control device described by Murase can balance usage of the regenerative brake system and the hydraulic brake system, for instance by causing the vehicle to use the regenerative brake system instead of the hydraulic brake system if the battery has available capacity to be charged by the regenerative brake system and/or if a temperature of the hydraulic brake system is above a threshold.

However, many brake systems for hybrid vehicles, electric vehicles, or other machines, such as the brake control device described by Murase, only select between using a regenerative brake system and a friction-based brake system. Accordingly, although such systems can determine to use regenerative brake systems in many situations, the systems can still determine to use friction-based brake systems in a relatively high percentage of situations. This can result in relatively high usage levels of friction-based brake systems, and thereby increase wear and tear on the friction-based brake systems that can reduce the usable life of the brake pads or other components of the friction-based brake systems, and/or lead to more frequent maintenance of the friction-based brake systems. Using the friction-based brake systems in a relatively high percentage of situations can also reduce the energy efficiency of machines, as energy associated with brake power that might otherwise be captured, stored, and/or used by a machine may be lost. Additionally, using friction-based brake systems in a relatively high percentage of situations can cause thermal capacities of the friction-based brake systems to be exceeded.

The example systems and methods described herein are directed toward overcoming one or more of the deficiencies described above.

SUMMARY OF THE INVENTION

According to a first aspect, a computer-implemented method includes identifying, by one or more processors, a braking operation of a machine. The computer-implemented method also includes determining, by the one or more processors, an amount of energy associated with brake power of the braking operation. The computer-implemented method further includes determining, by the one or more processors, available capacities of a plurality of systems of the machine to receive the amount of energy. The computer-implemented method additionally includes determining, by the one or more processors, a priority order of the plurality of systems based on system priority data. The priority order indicates that systems configured to store or re-use energy are higher priorities than other systems that are not configured to store or re-use energy. The computer-implemented method also includes allocating, by the one or more processors, one or more portions of the amount of energy to one or more systems of the plurality of systems in the priority order. The one or more portions are based on the available capacities of the one or more systems to receive the amount of energy. The computer-implemented method further includes invoking, by the one or more processors, the one or more systems during the braking operation.

According to a further aspect, a brake controller of a machine includes one or more processors and memory storing computer-executable instructions. The computer-executable instructions, when executed by the one or more processors, cause the one or more processors to perform operations. The operations include identifying a braking operation of the machine. The operations also include determining an amount of energy associated with brake power of the braking operation. The operations further include determining available capacities of a plurality of systems of the machine to receive the amount of energy. The operations additionally include determining a priority order of the plurality of systems based on system priority data. The priority order indicates that systems configured to store or re-use energy are higher priorities than other systems that are not configured to store or re-use energy. The operations also include allocating one or more portions of the amount of energy to one or more systems of the plurality of systems in the priority order. The one or more portions are based on the available capacities of the one or more systems to receive the amount of energy. The operations further include invoking the one or more systems during the braking operation.

According to another aspect, a machine includes a battery system, a regenerative brake system, one or more auxiliary systems, a mechanical brake system, and a brake controller. The regenerative brake system is configured to charge the battery system based on energy captured during a braking operation. The one or more auxiliary systems are configured to receive the energy. The brake controller is configured to identify a braking operation of the machine, and to determine an amount of energy associated with the brake power of the braking operation. The brake controller is also configured to determine available capacities of the battery system, the one or more auxiliary systems, and the mechanical brake system to receive the amount of energy. The brake controller is further configured to determine a priority order of the battery system, the one or more auxiliary systems, and the mechanical brake system. The priority order indicates that the mechanical brake system is a lower priority than the battery system and the one or more auxiliary systems. The brake controller is also configured to allocate one or more portions of the amount of energy to one or more of the battery system, the one or more auxiliary systems, or the mechanical brake system in the priority order. The one or more portions are based on the available capacities of the battery system, the one or more auxiliary systems, and the mechanical brake system to receive the amount of energy.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
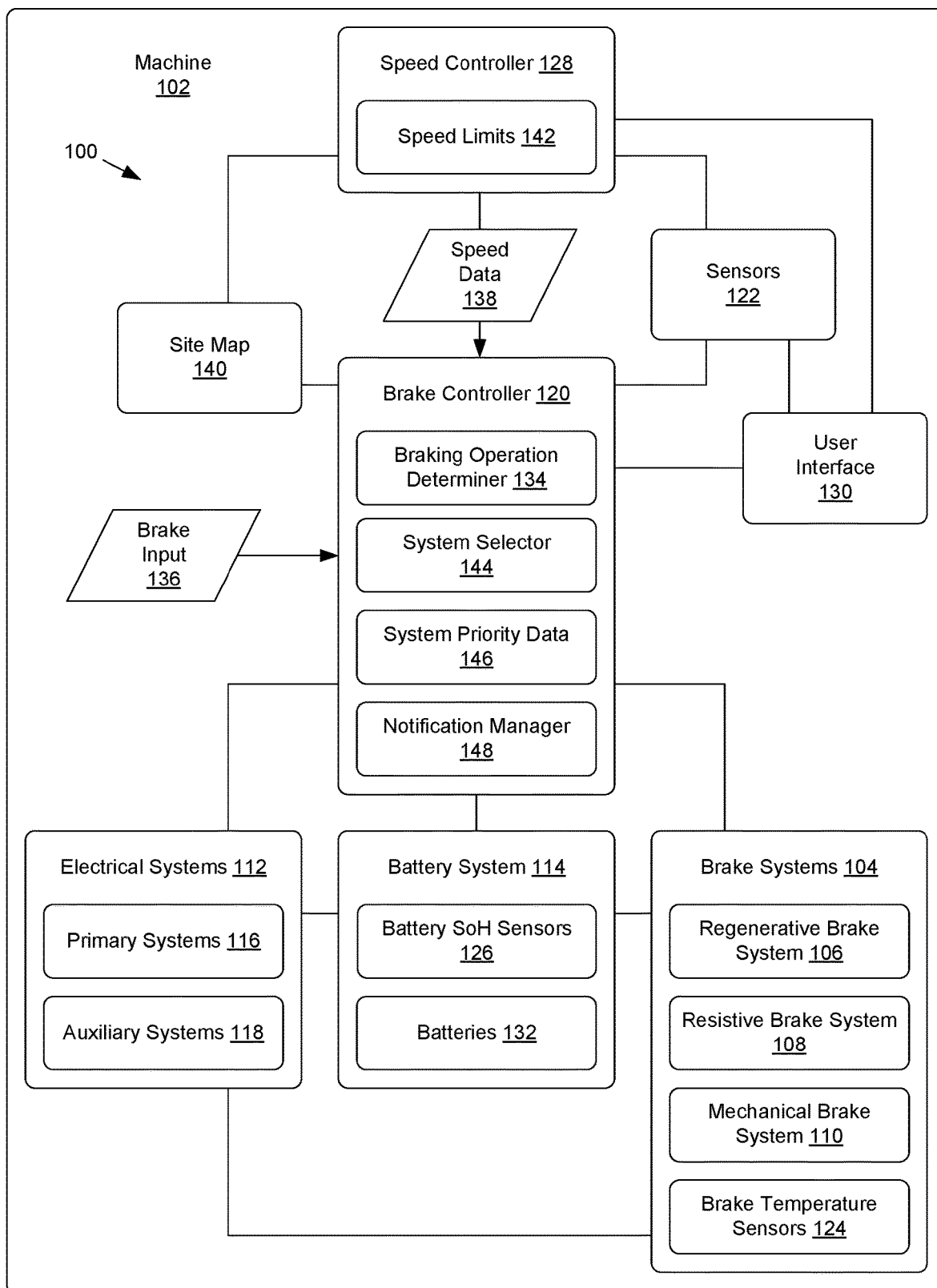
FIG. 1 shows an example brake control system for a machine that includes a set of brake systems.

FIG. 1 shows an example brake control system 100 for an example machine 102 that includes a set of brake systems 104. The brake systems 104 can include a regenerative brake system 106, a resistive brake system 108, and/or a mechanical brake system 110. The machine 102 can be a mobile machine or vehicle that includes one or more electrical systems 112 configured to be powered by a battery system 114, the regenerative brake system 106, and/or other sources of power. For example, the machine 102 can be a battery electric machine (BEM), a battery electric vehicle (BEV), a hybrid vehicle, a fuel cell and battery hybrid vehicle, or another mobile machine. The electrical systems 112 can include primary systems 116 and auxiliary systems 118. A braking operation that can be implemented by one or more of the brake systems 104 can be associated with an amount of brake power. For example, the regenerative brake system 106 can capture energy when the machine 102 performs a braking operation, and the captured energy can be associated with an amount of brake power. The brake control system 100 includes a brake controller 120 configured to determine which of the brake systems 104 to invoke for a particular braking operation, and/or how to distribute energy associated with the brake power of the braking operation among one or more of the brake systems 104, the battery system 114, one or more of the auxiliary systems 118, and/or other systems.

The machine 102 can, in some examples, be a commercial or work machine, such as a mining machine, earth-moving machine, backhoe, scraper, dozer, loader (e.g., large wheel loader, track-type loader, etc.), shovel, truck (e.g., mining truck, haul truck, on-highway truck, off-highway truck, articulated truck, etc.), a crane, a pipe layer, farming equipment, or any other type of mobile machine or vehicle. The machine 102 may operate at, and/or travel around, a worksite, such as a mine site, a quarry, a construction site, or any other type of worksite or work environment. In some examples, the machine 102 can have one or more work tools, such as a bucket, scraper, ripper, blade, pusher, fork, grapple, plow, or other type of work tool. The machine 102 can accordingly be configured to move and/or use one or more types of work tools to interact with rocks, gravel, dirt, sand, lumber, construction material, and/or any other type of material on a worksite. As an example, the machine 102 can be a haul truck that moves material around a worksite. In other examples, the machine 102 can be an electric automobile or other type of mobile machine used for personal transportation, commercial transportation, or other purposes, such as an electric vehicle configured to travel on public and/or private roads.

The machine 102 can be a staffed machine, a semi-autonomous machine, or an autonomous machine. In examples in which the machine 102 is a staffed machine or a semi-autonomous machine, a human operator or driver can operate, control, or direct some or all of the functions of the machine 102. However, in examples in which the machine 102 is autonomous or semi-autonomous, functions of the machine 102, such as steering, speed adjustments, and/or other functions can be fully or partially controlled, automatically or semi-automatically, by on-board and/or off board controllers or other computing devices associated with the machine 102. As an example, the machine 102 can have an electronic control module (ECM) and/or other on-board computing devices that can fully or partially control operations of the machine 102. For instance, the machine 102 can have an on-board guidance system that can drive the machine 102 autonomously, an obstacle detection system that assists the on-board guidance system or can alert a human operator of nearby objects detected by the obstacle detection system, and/or other systems that fully or partially control operations of the machine 102. As another example, an off-board computing device can receive data from the machine 102 and return instructions to the machine 102 to dispatch the machine 102 to autonomously travel along a defined and/or assigned route, or to fully or partially control operations of the machine 102 remotely.

The machine 102 can have one or more sensors 122. The sensors 122 can include cameras, LIDAR sensors, RADAR sensors, other optical sensors or perception systems, Global Positioning System GPS) sensors, other location and/or positioning sensors, payload sensors, speed sensors, brake temperature sensors 124, other temperature sensors, tire pressure sensors, battery state of health (SoH) sensors 126, incline and decline travel sensors, and/or other types of sensors. One or more of the sensors 122 can provide data to the brake controller 120, a speed controller 128, a separate ECM of the machine 102, and/or off-board computing systems, such that sensor data can be used to determine a location of the machine 102, detect nearby terrain, detect nearby objects, such as vehicles, other machines, or personnel, detect the positions of such nearby objects relative to the machine 102, determine a weight of a payload carried by the machine 102, determine a SoC of the battery system 114, and/or perform other operations. In some examples, data provided by the sensors 122 can enable the machine 102 to drive and/or operate autonomously or semi-autonomously. Data associated with one or more of the sensors 122 can also be provided to a driver or other operator of the machine 102 via a user interface 130, for example via dashboard indicator lights, screens, or other displays.

As discussed above, the machine 102 can include electrical systems 112, including primary systems 116 and auxiliary systems 118 that are configured to operate using energy provided by the battery system 114 and/or the regenerative brake system 106. The primary systems 116 can include electric engines, electric motors, electrical conversion systems, electric drivetrains, and/or other electrical components that are configured to convert and/or use energy to cause overall propulsion or movement of the machine 102, power movement and/or other operations of work tools associated with the machine 102, and/or otherwise power primary operations of the machine 102.

The auxiliary systems 118 can include other types of electrically-powered systems, such as such as heaters, coolers, fans, hydraulic pumps, hydraulic accumulators, accessory pumps, pumps associated with pressure regulating valves, charge and/or discharge accumulators, electric motors, electric converters, other electrical systems, audio systems, lights, display screens, navigation systems, and/or other systems and accessories. For example, the auxiliary systems 118 can include a battery temperature management system (BTMS) configured to control a temperature of the battery system 114, and/or heating, ventilation and air conditioning (HVAC) systems configured to control a temperature of a cab of the machine 102 and/or other elements of the machine 102. In some examples, one or more types of auxiliary systems 118 can have accumulators, capacitors, springs, and/or other elements capable of at least temporarily storing received energy. As discussed below, in some examples the brake controller 120 can activate one or more of the auxiliary systems 118 as parasitic systems to receive, store, and/or consume energy during situations in which those auxiliary systems 118 might otherwise be inactive.

The electrical systems 112 can also include other elements of the machine 102, such as the ECM and the sensors 122 discussed above, the user interface 130, wireless communication interfaces, and/or other elements. For example, the machine 102 can have one or more wireless communication interfaces, such as cellular interfaces, WiFi® interfaces, Bluetooth® interfaces, machine-to-machine data interfaces, and/or other types of wireless communication interfaces. The wireless communication interfaces can include modems, receivers, transmitters, antennas, and/or other hardware or software elements configured to send and receive data, for instance to exchange data with one or more off-board computing devices.

The battery system 114 of the machine 102 can include one or more batteries 132, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some examples, multiple battery cells can be grouped together, in series or in parallel, within a battery module. Multiple battery modules can also be grouped together, for instance in series, within a battery string. One or more battery, strings can be provided within a battery pack, such as a group of battery strings linked together in parallel. Accordingly, the battery system 114 can include one or more battery packs, battery strings, battery modules, and/or battery cells.

The battery system 114 can also include, or be associated with, one or more of the sensors 122, such as the battery SoH sensors 126 discussed above. The battery SaI sensors 126 can be configured to determine attributes associated with the battery system 114 and/or individual batteries 132. For example, the battery Soli sensors 126 can detect a current SoC of individual batteries 132 and/or the battery system 114 overall. In some examples, the battery SoH sensors 126 can also detect a state of health of individual batteries 132 and/or the battery system 114, temperatures associated with individual batteries 132 and/or the battery system 114, an operating state of the BTMS configured to control the temperature of the battery system 114, and/or other attributes or characteristics of the battery system 114.

As discussed above, the brake systems 104 of the machine 102 can include the regenerative brake system 106, the resistive brake system 108, and/or the mechanical brake system 110. The brake controller 120 can be a computing system associated with the brake systems 104, and can be configured to determine whether to invoke one or more of the regenerative brake system 106, the resistive brake system 108, or the mechanical brake system 110 during a braking operation.

In some examples, the braking operation can be a deceleration operation that applies braking torque to slow the speed of the machine 102 from a current speed to a lower speed, and/or to stop the machine 102. In other examples, the braking operation can be a retarding operation that applies braking torque to maintain a current speed of the machine 102. For instance, if the machine 102 is traveling downhill and might otherwise accelerate downhill, the one or more of the brake systems 104 can operate to prevent acceleration and thereby maintain the current speed of the machine 102.

The regenerative brake system 106 can be configured to capture kinetic energy and/or potential energy during braking operations of the machine 102. In some examples, energy captured by the regenerative brake system 106 can be stored in the battery system 114, and thereby charge one or more batteries 132 of the battery system 114. In other examples, energy captured by the regenerative brake system 106 can be used to directly power one or more electrical systems 112, such as one or more of the auxiliary systems 118, instead of or in addition to using the energy to charge the battery system 114. As described further below, energy captured by the regenerative brake system 106 can also be allocated to one or more other systems of the machine 102.

The resistive brake system 108 can be a dynamic braking system that is also configured to capture kinetic energy and/or potential energy during braking operations of the machine 102, and/or is configured to receive energy captured by the regenerative brake system 106. The resistive brake system 108 can include one or more resisters, such that the resistive brake system 108 can dissipate captured energy as heat in the resisters. For example, the resistive brake system 108 can include a resistive grid with a coil that can conduct electricity while blowers blow air across the coil. Such a resistive coil can consume energy by converting the energy to heat.

The mechanical brake system 110 can include mechanical components, such as mechanical elements configured to apply brake pads against rotors, or to apply brake disks against plates through a piston, to frictionally slow down wheels of the machine 102. The mechanical brake system 110 can be a service brake system, such as a hydraulic braking system or other mechanical braking system.

The brake systems 104 can also include, or be associated with, one or more of the sensors 122, such as the brake temperature sensors 124 discussed above. The brake temperature sensors 124 can be configured to determine temperatures associated with the regenerative brake system 106, the resistive brake system 108, and/or the mechanical brake system 110, and provide corresponding temperature data to the brake controller 120. For example, as the mechanical brake system 110 applies brake pads against rotors to frictionally slow down wheels of the machine 102, heat generated by the friction can increase a temperature associated with the mechanical brake system 110. The brake temperature sensors 124 can accordingly provide temperature data indicating a temperature of the mechanical brake system 110 to the brake controller 120.

The brake controller 120 can have a braking operation determiner 134 configured to identify a braking operation that is occurring or will occur, and to determine brake power associated with the braking operation. The braking operation determiner 134 can identify a braking operation, and/or brake power associated with the braking operation, based on brake input 136, speed data 138 received from a speed controller 128, a site map 140, feedback provided by the electrical systems 112, the battery system 114, and/or the brake systems 104, and/or other factors.

In some examples, the brake input 136 can be based on operator commands provided by a driver or other operator of the machine 102. For example, a driver can press a brake pedal, release an accelerator pedal, move levers, press buttons, and/or otherwise provide user input indicating a desire to slow down the machine 102 based on an indicated deceleration rate, to maintain a current speed of the machine 102, or to adjust the speed of the machine 102 to a specified speed. The braking operation determiner 134 can accordingly determine that a user has requested a braking operation based on user-provided brake input 136. As described further below, the brake controller 120 can implement the braking operation in part by determining one or more systems of the machine 102 to invoke during the braking operation.

In other examples, the braking operation determiner 134 can determine the brake input 136, or modify user-provided brake input 136, based on speed data 138 provided by the speed controller 128. The speed controller 128 can be a computing system configured to control and/or regulate a speed of the machine 102. The speed data 138 can indicate a current speed of the machine 102, speed limits 142 associated with the machine 102, automated braking commands associated with the machine 102, and/or other information associated with a current or future speed of the machine 102. The braking operation determiner 134 can accordingly identify a braking operation based on user-provided brake input 136 and/or speed data 138 provided by the speed controller 128.

For example, the speed controller 128 can be configured with speed limits 142 that indicate maximum or recommended speeds for the machine 102 based on temperatures of the brake systems 104, a location of the machine 102 on a worksite or other area, incline or decline angles of terrain being traveled by the machine 102, a weight of a payload being carried by the machine 102, and/or other factors. For instance, if the brake temperature sensors 124 indicate that a temperature of the mechanical brake system 110 exceeds a defined temperature threshold, the speed limits 142 can indicate that the current speed of the machine 102 should be reduced to a lower speed. Accordingly, if the machine 102 is traveling at, or accelerating to, a speed that exceeds a speed limit defined by the speed limits 142, the speed controller 128 can provide speed data 138 to the brake controller 120 that requests deceleration of the machine 102 or that limits speeds and/or acceleration requested by a user.

As another example, the speed data 138 can be based on an automated braking command generated by the speed controller 128 or received by the speed controller 128 from another source, such as the ECM of the machine 102 or an off-board computing device. The automated braking command can request that the machine 102 perform a braking operation based on an autonomous machine command, an off-board instruction to slow the machine 102 or maintain a speed of the machine 102, an automatic detection of a nearby obstacle, a cruise control setting to maintain a set speed of the machine 102, or any other condition that triggers an automatic braking operation of the machine 102.

In still other examples, the braking operation determiner 134 can predict an upcoming braking operation of the machine 102, or otherwise determine a braking operation that the machine 102 is to perform at a future time or at a particular location. The braking operation determiner 134 can predict or determine an upcoming braking operation of the machine 102 based on the site map 140, historical data associated with braking operations, work cycles, or other operations previously performed by the machine 102 or similar machines, and/or other data.

The site map 140 can indicate terrain of a worksite or other area, locations and/or identities of obstacles, the location of the machine 102, locations of roads or other routes, ground types and/or ground conditions, and/or other information. For instance, the site map 140 can indicate positions of fixed and/or movable obstacles on the worksite, such as other machines, personnel, lakes, ponds, rivers, cliff faces, hills, roads, intersections, mounds of dirt, gravel, or other material, and/or other types of objects, terrain features, or obstacles. The site map 140 can also indicate grades or slopes of the terrain, such as incline levels or decline levels associated with portions of a worksite. In some examples, the site map 140 can be a predetermined map of the worksite or other area. In other examples, the machine 102 itself can generate the site map 140 based on terrain slopes, machine travel headings, grid coordinates, other geographical coordinates, and/or other data detected by the machine 102 in association with paths previously traversed by the machine 102 through the area covered by the site map 140.

The braking operation determiner 134 can also access or maintain historical data associated with previous braking operations, previous work cycles, and/or other machine operations performed by the machine 102 or other machines at locations on the worksite indicated by the site map 140. Such historical data can, for example, indicate that the machine 102 previously performed a braking operation during travel through a section of the worksite during a previous work cycle, and thus may be likely to perform a similar braking operation at the same section of the worksite during a subsequent work cycle.

Accordingly, if the site map 140 indicates that the machine 102 is at a particular location and is headed toward a downhill section, the braking operation determiner 134 can determine that the machine 102 is likely to begin performing a braking operation to control speed when the machine 102 reaches the downhill section. Similarly, if historical information indicates that the machine 102 previously performed a braking operation during a previous work cycle while traversing the downhill section, the braking operation determiner 134 can determine that the machine 102 is likely to perform a similar braking operation when the machine 102 reaches the downhill section during a current work cycle. The braking operation determiner 134 can accordingly use speed data 138 to determine a current speed of the machine 102 and estimate when the machine 102 will initiate the braking operation. The braking operation determiner 134 can also use the site map 140 and/or other data to determine or predict brake power associated with the upcoming braking operation, as discussed further below.

In other examples, the brake controller 120 and/or speed controller 128 can use the site map 140, historical work cycle data, and/or other data to determine that the machine 102 should preemptively brake in advance of reaching an upcoming downhill section or other area, so that subsequent braking operations associated with the upcoming downhill section or other area are associated with a reduced amount of brake power. For example, the site map 140 can indicate that the machine 102 will reach a downhill section in 50 meters. The brake controller 120 and/or speed controller 128 can accordingly schedule or otherwise cause the machine 102 to perform preemptive braking operations to reduce the speed of the machine 102 while the machine 102 travels through those 50 meters. Accordingly, rather than performing braking operations associated with a relatively high amount of brake power once the machine 102 reaches the downhill section, the already-slowed machine 102 can decelerate or maintain a slower speed using braking operations associated with lower amounts of brake power once the machine 102 reaches the downhill section. As discussed further below, such a lower amount of brake power may be more likely to lead to a higher percentage of captured energy being stored and re-used by systems such as the battery system 114 and/or auxiliary systems 118, instead of that energy being lost or wasted as heat.

In some examples, the brake controller 120 and/or speed controller 128 can use the site map 140, historical work cycle data, and/or other data to determine that a brake operation performed by the machine 102 at a particular worksite location during a previous work cycle caused more energy to be captured than could be stored and re-used by systems of the machine 102. Accordingly, the brake controller 120 and/or speed controller 128 can determine that, during a subsequent work cycle, the machine 102 should travel at a slower speed before reaching that particular worksite location, perform a braking operation with a lower deceleration rate over a longer distance, or otherwise adjust machine operations in order to perform a braking operation with a lower amount of brake power in association with the particular worksite location. By adjusting operations of the machine 102 during a current work cycle to lower brake power associated with an upcoming braking operation, based on historical brake power levels associated with prior braking operations performed during previous work cycles, the adjustments to the operations of the machine 102 can lead to a higher percentage of captured energy being stored and re-used by systems of the machine 102 during the current work cycle.

In some examples, the brake controller 120 and/or speed controller 128 can use a machine learning model, trained on a training data set indicating how adjustments to machine operations changed brake power levels associated with braking operations, to determine which adjustments to operations of the machine 102 are likely to increase amounts of captured energy being stored and re-used by systems of the machine 102. In some examples, the machine learning model can be trained by an off-board computing system, and the trained machine learning model can be provided to the brake controller 120 and/or the speed controller 128. The machine learning model can be based on convolutional neural networks, recurrent neural networks, other types of neural networks, nearest-neighbor algorithms, regression analysis. Gradient Boosted Machines (GBMs), Random Forest algorithms, deep learning algorithms, and/or other types of artificial intelligence or machine learning framework. The machine learning model can be trained using a supervised or unsupervised machine learning approach, for instance based on the training data set.

Overall, the braking operation determiner 134 can determine that the machine 102 is to perform a braking operation based on brake input 136, information in speed data 138 provided by the speed controller 128 (such as a current speed, speed limits 142, automatic braking commands, and/or other speed data), the site map 140, historical work cycle information, and/or other information. As described further below, the brake controller 120 can implement the braking operation in part by determining which systems of the machine 102 to invoke during the braking operation.

When the braking operation determiner 134 identifies a braking operation, the braking operation determiner 134 can also determine an amount of brake power associated with the braking operation. For example, based on a current speed of the machine 102, a deceleration rate and/or requested speed indicated by the brake input 136 and/or the speed data 138, incline or decline angles of terrain detected by the machine 102 or determined based on the site map 140, a weight of the machine 102 and/or a payload carried by the machine 102, attributes of the brake systems 104, historical data indicating amount of brake power generated by similar braking operations during previous work cycles, and/or other factors, the braking operation determiner 134 can determine an amount of brake power associated with the braking operation.

The amount of brake power associated with the braking operation can be associated with an amount of torque associated with implementation of the braking operation by one or more of the primary systems 116 and/or one or more of the brake systems 104. In some examples, the amount of brake power associated with the braking operation can correspond with an amount of kinetic energy and/or potential energy that could be potentially be captured by the regenerative brake system 106 and/or the resistive brake system 108 during implementation of the braking operation. However, as discussed further below, the amount of energy associated with the brake power of the braking operation can, in some situations, exceed capacities of the regenerative brake system 106 and/or the resistive brake system 108 to capture and/or use the energy.

As a non-limiting example, a request to brake quickly at a relatively high deceleration rate can be associated with a higher amount of torque, and thus a relatively high amount of energy that could potentially be captured by the regenerative brake system 106. Another request to change from a current speed to slightly slower speed, or to maintain a current speed, can be associated with a lower amount of torque, and thus a lower amount of energy that could potentially be captured by the regenerative brake system 106.

In addition to using brake input 136, speed data 138, and/or other data to identify a braking operation and to determine an amount of brake power associated with the braking operation, the brake controller 120 can use feedback data to determine current usage levels, currently-available capacities, and/or other attributes of the brake systems 104, the battery system 114, and the auxiliary systems 118. The brake controller 120 can accordingly determine which of the systems of the machine 102 to invoke during a braking operation based in part on the current usage levels, currently-available capacities, and/or other attributes of such systems.

For example, feedback from the battery system 114 can indicate a current SoC of the batteries 132, a maximum SoC of the batteries 132, a currently available capacity of the batteries 132 indicating how much additional energy the batteries 132 could store, and/or a current maximum charge rate at which energy could be transferred to the batteries 132. The currently available capacity can indicate how much energy captured by the regenerative brake system 106 during a braking operation could be provided to the battery system 114 to charge the batteries 132. Similarly, the current maximum charge rate can indicate a rate at which the regenerative brake system 106 could provide energy to the battery system 114 during a braking operation.

As another example, feedback from the resistive brake system 108 can indicate a current amount of energy being consumed by the resistive grid, and/or a currently available capacity for additional energy that could be consumed by the resistive grid. Such feedback can indicate how much energy could be provided to, and be consumed by, the resistive brake system 108 during a braking operation.

As yet another example, feedback from the auxiliary systems 118 can indicate a current amount of energy being drawn by the auxiliary systems 118. For example, one or more auxiliary systems 118, such as a radio, lights, a navigation system, an air conditioning system, hydraulic systems, such as hydraulic pumps and/or accumulators, electric systems, such as electric motors and/or converters, and/or other systems may currently be active and drawing a current amount of energy. The feedback from the auxiliary systems 118 can also indicate a maximum parasitic capacity of the auxiliary systems 118 to draw additional amounts of energy beyond the current amount of energy being drawn by the auxiliary systems 118. For example, one or more of the auxiliary systems 118 can be activated as parasitic systems to intentionally draw additional energy. Similarly, currently-active auxiliary systems 118 be adjusted to intentionally draw additional energy. As non-limiting examples, the auxiliary systems 118 can have a parasitic capacity to receive, store, and/or consume additional energy by turning on additional lights, by activating or turning up heating and/or cooling systems, turning on fans or increasing fan speeds, by turning on hydraulic systems or other elements that receive, store, and/or consume energy, and/or by otherwise increasing the amount of energy drawn by one or more auxiliary systems 118.

In some examples, the brake controller 120 can be configured to avoid using certain auxiliary systems 118 as parasitic systems based on environmental factors or other factors. For instance, if the machine 102 is a staffed machine, the brake controller 120 can avoid turning on a heater in the cab of the machine 102 as a parasitic system if an ambient temperature measurement is above a threshold temperature, even if the cab heater would use a relatively high amount of energy. In some examples, some parasitic systems can be used in combination. For instance, the brake controller 120 can turn on a battery heating system and a battery cooling system of the machine 102 simultaneously to increase energy consumption, and to heat and cool the battery system 114 simultaneously without moving a temperature of the battery system 114 outside an operating range.

As discussed above, the brake controller 120 can determine which systems of the machine 102, such as which of the brake systems 104, to invoke during a braking operation, based at least in part on an amount of brake power associated with the braking operation. The brake controller 120 can have a system selector 144 configured to select one or more specific systems to invoke for a braking operation, based on feedback indicating usage levels and/or available capacities of the systems and based on system priority data 146.

The system priority data 146 can indicate a priority order of various systems of the machine 102, including one or more of the brake systems 104, the battery system 114, and/or the auxiliary systems 118. For example, the system selector 144 can prioritize selecting and invoking a highest-priority system indicated by the system priority data 146 to receive energy associated with brake power of a braking operation. If the amount of energy associated with brake power of a braking operation is above a currently available capacity of the highest-priority system to receive energy, the system selector 144 can invoke the highest-priority system as well as one or more additional systems in an order indicated by the system priority data 146. For instance, the system selector 144 can allocate energy associated with brake power of a braking operation to one or more high-priority systems, up to the currently available capacity of those high-priority systems to receive energy, and allocate the remainder of the energy associated with the brake power of the braking operation to the next-highest-priority system that has a currently available capacity sufficient to receive the remaining energy.

Overall, the system priority data 146 can indicate that one or more systems of the machine 102 that are configured to capture, store, and/or re-use captured energy associated with brake power are the highest priorities. The system priority data 146 can indicate that other systems of the machine 102 that are not configured to re-use captured energy associated with brake power are lower priorities. In some examples, the system priority data 146 can rank such lower-priority systems in order to minimize usage of certain lower-priority systems that may be more at risk of damage and/or a reduction in remaining usable life when the lower-priority systems are used.

As a non-limiting example, the system priority data 146 can indicate that use of the regenerative brake system 106 to charge the battery system 114 and/or power currently-active auxiliary systems 118 has the highest priority, that use of the resistive brake system 106 has second highest priority, that use of additional auxiliary systems 118 has the third highest priority, and that use of the mechanical brake system 110 has the lowest priority. Accordingly, in this example, the system selector 144 can prioritize using the highest-priority regenerative brake system 106 to charge the battery system 114 and/or power currently-active auxiliary systems 118, so that energy associated with a braking operation can be captured, stored, and/or re-used by the machine 102.

In this example, the system selector 144 can similarly avoid using the lowest-priority mechanical brake system 110 in many situations, unless the system selector 144 determines that a braking operation will be associated with excess energy beyond a level of energy that can be stored or consumed by the higher-priority regenerative brake system 106, the resistive brake system 108, and the auxiliary systems 118. By avoiding use of the lowest-priority mechanical brake system 110 in favor of other higher-priority systems in many situations, the life of brake pads and other mechanical elements of the mechanical brake system 110 can be extended, and brake power associated with braking operations can be more efficiently stored and/or used. The system priority data 146 can accordingly cause the system selector 144 to prioritize allocating excess energy, beyond energy that can be captured, stored, and/or re-used by the machine 102, to the resistive brake system 108 and/or to additional auxiliary systems 118, instead of to the mechanical brake system 110. The resistive brake system 108 and/or additional auxiliary systems 118 may be able to receive and/or consume such excess energy with a lower risk of decreasing the remaining usable life of those system, relative to a risk of decreasing the remaining usable life of the mechanical brake system 110 if the excess energy were allocated to the mechanical brake system 110. Additionally, the total braking capacity of the machine 102 can be maximized by actively invoking energy sinks that would otherwise be passive, or operating at reduced levels.

In some examples, the brake controller 120 can also have a notification manager 148 configured to display notifications to a driver or other operator of the machine 102 via the user interface 130 in response to defined conditions. The user interface 130 can be a display screen, indicator lights, dashboard indicators, and/or user-perceptible elements. The notifications may indicate that one or more lower-priority systems are being invoked for a braking operation, and/or suggest actions to reduce the likelihood of such lower-priority systems being invoked for future braking operations.

As an example, the system priority data 146 can indicate that the regenerative brake system 106 providing energy associated with brake power to the battery system 114 is a higher priority than consuming energy in a resistive grid of the resistive brake system 108. However, if the battery system 114 does not have enough available capacity to store energy associated with brake power that could be generated by the regenerative brake system 106 during a braking operation, the system selector 144 can cause the higher-priority regenerative brake system 106 to provide energy to the battery system 114 up to the currently-available capacity of the battery system 114, and cause the lower-priority resistive brake system 108 to consume any additional remaining energy associated with the brake power. In this situation, the notification manager 148 can prompt display, via the user interface 130, of a notification to a driver that indicates that some of the brake power generated through a braking operation is not being used to charge the battery system 114.

The notification may suggest that the driver decrease speeds to reduce amounts of brake power associated with subsequent braking operations, such that more, or all, of the energy associated with brake power of the subsequent braking operations can be provided to the battery system 114 by the regenerative brake system 106. In other examples, the brake controller 120 and/or the speed controller 128 can automatically apply speed limits 142 in this situation to reduce the speed of the machine 102 and to thereby reduce amounts of brake power associated with subsequent braking operations so that more energy associated with the brake power is provided to the battery system 114, or the notification manager 148 can include a user-selectable option or a suggestion associated with such speed limits 142 in a notification presented via the user interface 130, such that the driver can choose to apply such speed limits 142.

As another example, if higher-priority systems do not have sufficient capacity to receive and/or consume all of the energy associated with brake power of a braking operation, the system selector 144 can determine to apply any remaining energy associated with the brake power to the lowest-priority system indicated by the system priority data 146. However, the notification manager 148 can prompt display, via the user interface 130, of a notification to a driver indicating that the lowest-priority system is being used for the braking operation. For instance, if the mechanical brake system 110 is the lowest-priority system, but the system selector 144 determines that higher-priority systems can at most receive 90% of the energy associated with brake power of a braking operation, the remaining 10% of the energy can be used by the mechanical brake system 110. In this situation, the notification manager 148 can prompt display, via the user interface 130, of a notification that indicates that the lowest-priority mechanical brake system 110 is being used for the braking operation, and indicate that some of the brake power associated with the braking operation is not being used to charge the battery system 114 or for other uses associated with higher-priority systems.

The notification can accordingly suggest that the driver decrease the speed of the machine 102 to reduce amounts of brake power associated with subsequent braking operations, such that additional use of the mechanical brake system 110 can be avoided and/or more of the energy associated with the brake power of subsequent braking operations can be provided to the battery system 114 by the regenerative brake system 106. In some examples, if a temperature associated with the mechanical brake system 110 exceeds a predefined temperature threshold, the notification can also indicate a higher urgency level associated with a suggestion to slow down to avoid further use of the mechanical brake system 110, and/or the brake controller 120 and/or the speed controller 128 can automatically apply speed limits 142 to reduce the speed of the machine 102 to avoid further use of the mechanical brake system 110.

Although the notification manager 148 can cause display of notifications to a driver of the machine 102 as discussed above, the notification manager 148 can also, or alternately, cause similar notifications or information to be transmitted to an off-board computing system. For example, the notification manager 148 can transmit information to a fleet manager, worksite controller, or other off-board computing system indicating how much energy captured during braking operations of the machine 102 is being allocated to systems that can store or re-use the captured energy, and how much of the energy is being allocated to other lower-priority systems. The off-board computing system can use such information to determine and/or monitor energy recovery performance metrics associated with individual machines, a fleet of machines, and/or machine operators. Accordingly, if such metrics indicate that a particular machine operator has relatively low energy recovery performance metrics, a fleet owner may provide that machine operator with feedback or training that may increase the machine operator's energy recovery performance metrics over time.

Overall, the brake controller 120 can use brake input 136 and/or speed data 138 to identify a braking operation of the machine 102 that is occurring, or is likely to occur. The brake controller 120 can also determine an amount of brake power associated with the braking operation, and can use feedback data to determine current, usage levels and/or currently-available capacities of a set of systems that are prioritized according to the system priority data 146, as discussed further below with respect to FIG. 2. The brake controller 120 can also determine whether to provide energy associated with the brake power to one or more higher-priority systems during the braking operation, up to currently-available capacities of those higher-priority systems to consume energy, and can determine whether to provide any excess energy to a lower-priority system, as discussed further below with respect to FIG. 3. Accordingly, energy associated with brake power can be most often provided to higher-priority systems during braking operations, and usage of lower-priority systems can be reduced during braking operations.

Figure 2:
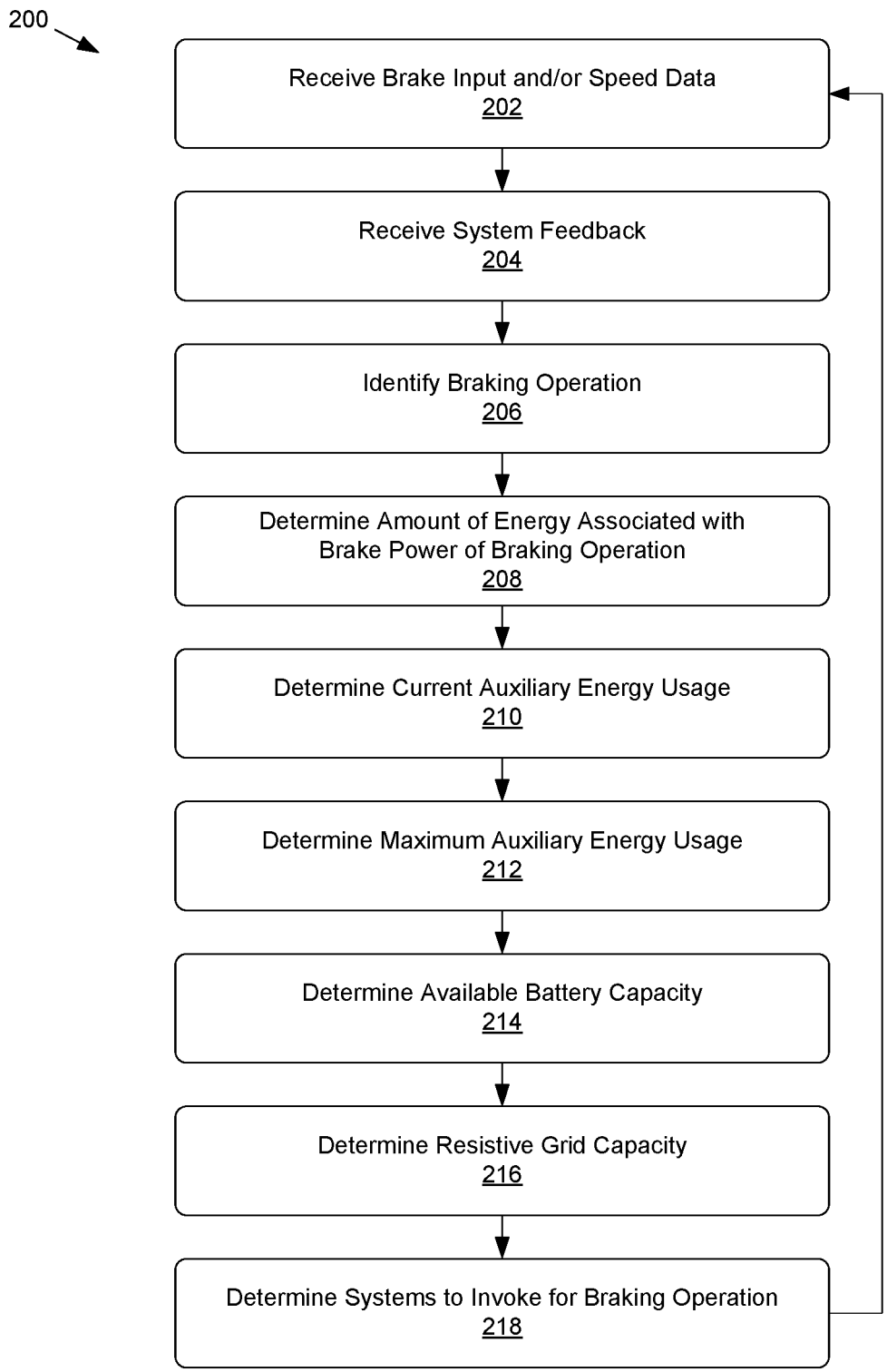
FIG. 2 shows a flowchart illustrating an example process for determining brake power associated with a braking operation, and for determining capacities of systems of the machine to consume energy associated with the brake power.
Figure 4:
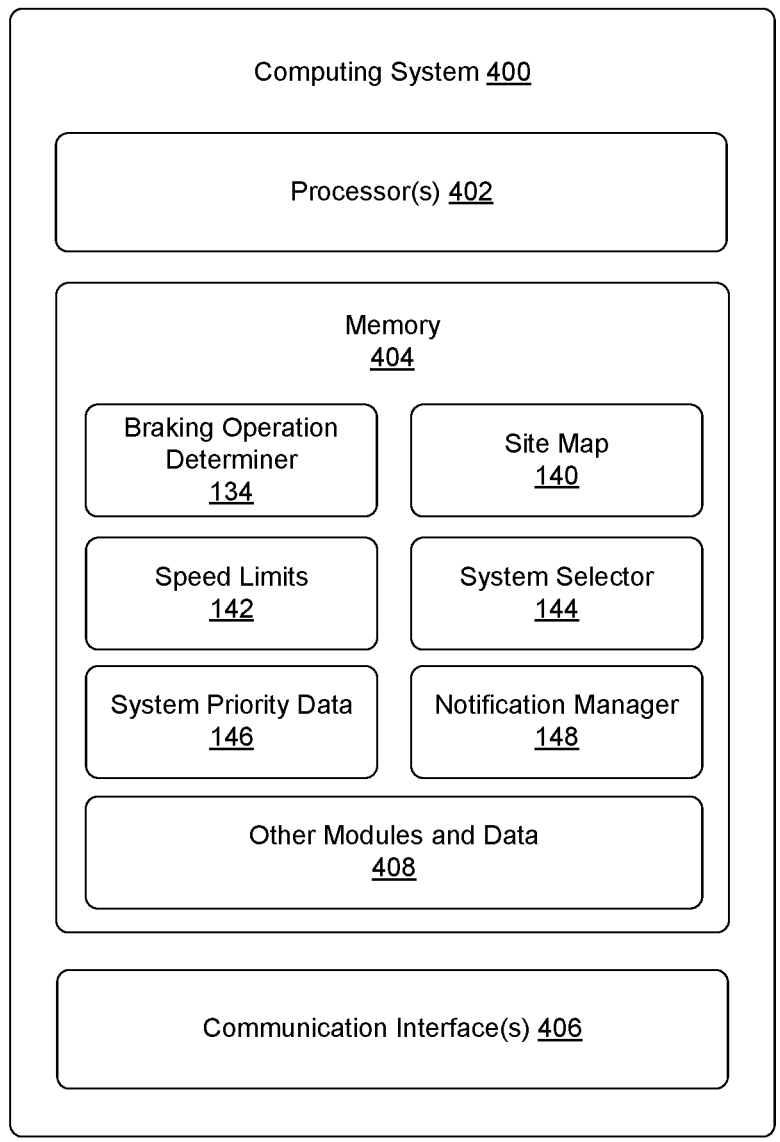
FIG. 4 shows an example system architecture for a computing system.

FIG. 2 shows a flowchart 200 illustrating an example process for determining brake power associated with a braking operation, and for determining capacities of systems of the machine 102 to consume energy associated with the brake power. The operations shown in FIG. 2 can be performed by a system that includes the braking operation determiner 134, the system selector 144, and/or other elements of the brake controller 120. An example architecture of a computing system associated with the brake controller 120 is shown in FIG. 4, and is described below with respect to that figure.

At block 202, the brake controller 120 can receive brake input 136 and/or speed data 138. The brake input 136 can be a user command indicating a requested operation to reduce or maintain a speed of the machine 102, or to adjust the speed of the machine 102 to a particular specified speed. The speed data 138 can be provided by the speed controller 128, and can indicate a current speed of the machine 102, speed limits 142 that apply to the machine 102 in defined situations, an autonomous command to adjust the speed of the machine 102, and/or other information associated with a speed of the machine 102.

At block 204, the brake controller 120 can receive system feedback from one or more systems of the machine 102. For example, the brake controller 120 can receive system feedback from one or more of the electrical systems 112, the battery system 114, and/or the brake systems 104 at block 204. The system feedback received at block 204 can indicate current information associated with the systems, such as a current amount of energy being drawn by the auxiliary systems 118, a current maximum amount of energy that could be drawn by the auxiliary systems 118, a current SoC of the battery system 114, a currently-available capacity of the battery system 114 to receive and store energy in the batteries 132, a current amount of energy being consumed by a resistive grid of the resistive brake system 108, a currently-available capacity of the resistive grid of the resistive brake system 108 to receive and consume additional energy, current usage levels associated with the mechanical brake system 110, temperature data associated with one or more of the brake systems 104, and/or other types of system feedback.

At block 206, the brake controller 120 can identify a braking operation associated with the machine 102. For example, based on a current speed indicated by the speed data 138, and/or brake input 136 that indicates a desired speed or a deceleration rate, the brake controller 120 can determine that the machine 102 is, or will be, performing a braking operation to slow the machine 102 from the current speed or to maintain the current speed of the machine 102. As another example, based on a downhill grade of upcoming terrain along the current path of the machine 102 indicated by the site map 140, speed data 138 indicating that the current speed of the machine 102 is to be maintained, historical work cycle data associated with the upcoming terrain, and/or other factors, the brake controller 120 can determine that the machine 102 will be performing a braking operation to counteract downhill acceleration to maintain the current speed of the machine 102. As yet another example, based on terrain information indicated by the site map 140, historical work cycle data, and/or other information, the brake controller 120 can determine that the machine 102 should perform a braking operation to slow the machine 102 before the machine 102 reaches a downhill segment of a current path being traversed by the machine 102.

At block 208, the brake controller 120 can determine an amount of energy associated with brake power of the braking operation identified at block 206. For example, based on a weight of the machine 102, a current speed of the machine 102, a deceleration rate and/or a desired speed associated with the braking operation, capabilities of the primary systems 116 and/or the brake systems 104 to brake the machine 102, and/or other factors, the brake controller 120 can determine an amount of torque associated with implementation of the braking operation by one or more of the primary systems 116 and/or one or more of the brake systems 104.

In some examples, the brake controller 120 can determine a braking force associated with the braking operation based on a target speed of the machine 102 and a timeframe to achieve the target speed. The brake controller 120 can also use the target speed to determine a kinetic power, associated with deceleration and/or rolling resistance, and use a terrain grade to determine a gravitational power. The brake controller 120 can add the kinetic power and the gravitational power together, divide the sum by the machine velocity, and multiply by a tire rolling radius to determine the overall amount of torque associated with the braking operation.

As discussed above, the amount of brake power associated with the braking operation can correspond with an amount of kinetic energy and/or potential energy that could be potentially be captured by the regenerative brake system 106 and/or the resistive brake system 108 during implementation of the braking operation. Accordingly, based on amounts of torque associated with the braking operation, and amounts of energy that will be captured during the braking operation, the brake controller 120 can determine an amount of energy associated with the brake power of the braking operation.

At block 210, the brake controller 120 can determine a current auxiliary energy usage level associated with the auxiliary systems 118. For example, the system feedback received at block 204 can indicate which auxiliary systems 118 are currently active, and can indicate an amount of energy currently, being received, stored, and/or consumed by the active auxiliary systems 118.

At block 212, the brake controller 120 can determine a maximum auxiliary energy usage level associated with the auxiliary systems 118. For example, the system feedback received at block 204 can indicate which auxiliary systems 118 are currently inactive and/or which active auxiliary systems 118 could be adjusted to receive, store, and/or consume additional energy. Accordingly, the brake controller 120 can use the system feedback to determine which inactive auxiliary systems 118 can be activated as parasitic systems to draw additional energy, which currently-active auxiliary systems 118 can be adjusted to draw additional energy as parasitic systems, and a maximum amount of energy that could be drawn by the auxiliary systems 118 if such auxiliary systems 118 were activated and/or adjusted.

At block 214, the brake controller 120 can determine a currently-available capacity of the battery system 114. In some examples, the system feedback received at block 204 can directly indicate a currently-available capacity of the battery system 114, associated with an amount of energy that could be used to charge the batteries 132 to a maximum SoC beyond a current SoC of the batteries 132. In other examples, the system feedback received at block 204 can indicate the current SoC of the batteries 132 and the maximum SoC of the batteries 132, and the brake controller 120 can determine the currently-available capacity of the battery system 114 based on a difference between the current SoC and the maximum SoC of the batteries. In some examples, the brake controller 120 can also use the system feedback received at block 204 to determine a current maximum charge rate of the battery system 114 that indicates a maximum rate at which the regenerative brake system 106 could provide energy to the regenerative brake system 106.

At block 216, the brake controller 120 can determine a currently-available capacity of the resistive grid of the resistive brake system 108. In some examples, the system feedback received at block 204 can directly indicate a currently-available capacity of the resistive grid of the resistive brake system 108 to receive and consume additional energy. In other examples, the system feedback received at block 204 can indicate a current amount of energy being consumed by the resistive grid and a maximum amount of energy that can be consumed by the resistive grid over a period of time, and the brake controller 120 can determine the currently-available capacity of the resistive grid based on a difference between the current consumption level and the maximum consumption level of the resistive grid.

At block 218, the brake controller 120 can determine which systems of the machine 102 to invoke for the braking operation identified at block 206. For example, based on the brake power associated with the braking operation determined at block 208, the current usage levels, currently-available capacities, and/or other attributes of the systems determined at block 210, block 212, block 214, and block 216, and the system priority data 146, the brake controller 120 can determine which of the systems to invoke during the braking operation and how to allocate energy associated with the brake power among the invoked systems.

The brake controller 120 can determine, at block 218, which of the systems to invoke during the braking operation based at least in part on system priority data 146 indicating priorities of the systems. As described above, the system priority data 146 can indicate that systems capable of storing and/or re-using energy, such as the battery system 114 and/or the auxiliary systems 118, are higher priorities than other systems. Accordingly, the brake controller 120 can invoke specific systems based on the system priority data 146 to maximize amounts of energy that can be stored and/or re-used by systems of the machine 102. The brake controller 120 can also invoke additional lower-priority systems to receive and consume any excess energy beyond capacities of the higher-priority systems to receive, store, and/or re-use energy. A non-limiting example of determining which systems of the machine 102 to invoke is discussed further below with respect to FIG. 3.

After determining which systems to invoke at block 218, the brake controller 120 can also activate the selected systems to implement the braking operation and/or cause the selected systems to receive allocated portions of energy associated with the brake power. The brake controller 120 can also return to block 202 to receive updated brake input 136 and/or speed data 138 associated with a subsequent braking operation. In some examples, the subsequent braking operation can be a continuation of the previous braking operation. For instance, a driver may have depressed a brake pedal further, relative to a previous position of the brake pedal, such that updated brake input 136 indicates a command to decelerate the machine 102 at an increased deceleration rate.

The brake controller 120 can also receive updated system feedback at block 204, for instance based on how conditions or attributes of one or more systems have changed based on previous and/or current braking operations and corresponding energy associated with the brake power allocated to those systems. The brake controller 120 can use the updated data received at block 202 and 204 to identify the subsequent braking operation at block 206, determine an updated amount of brake power associated with the subsequent braking operation at block 208, determine updated usage levels, currently-available capacities, and/or other attributes of the systems at block 210, block 212, block 214, and block 216, and determine which systems to invoke for the subsequent braking operation at block 218. Accordingly, the brake controller 120 can continually loop through the process of FIG. 2 to dynamically adjust which systems are invoked for braking operations, and how much energy associated with brake power is allocated to those systems, as conditions associated with the machine 102 change.

Figure 3:
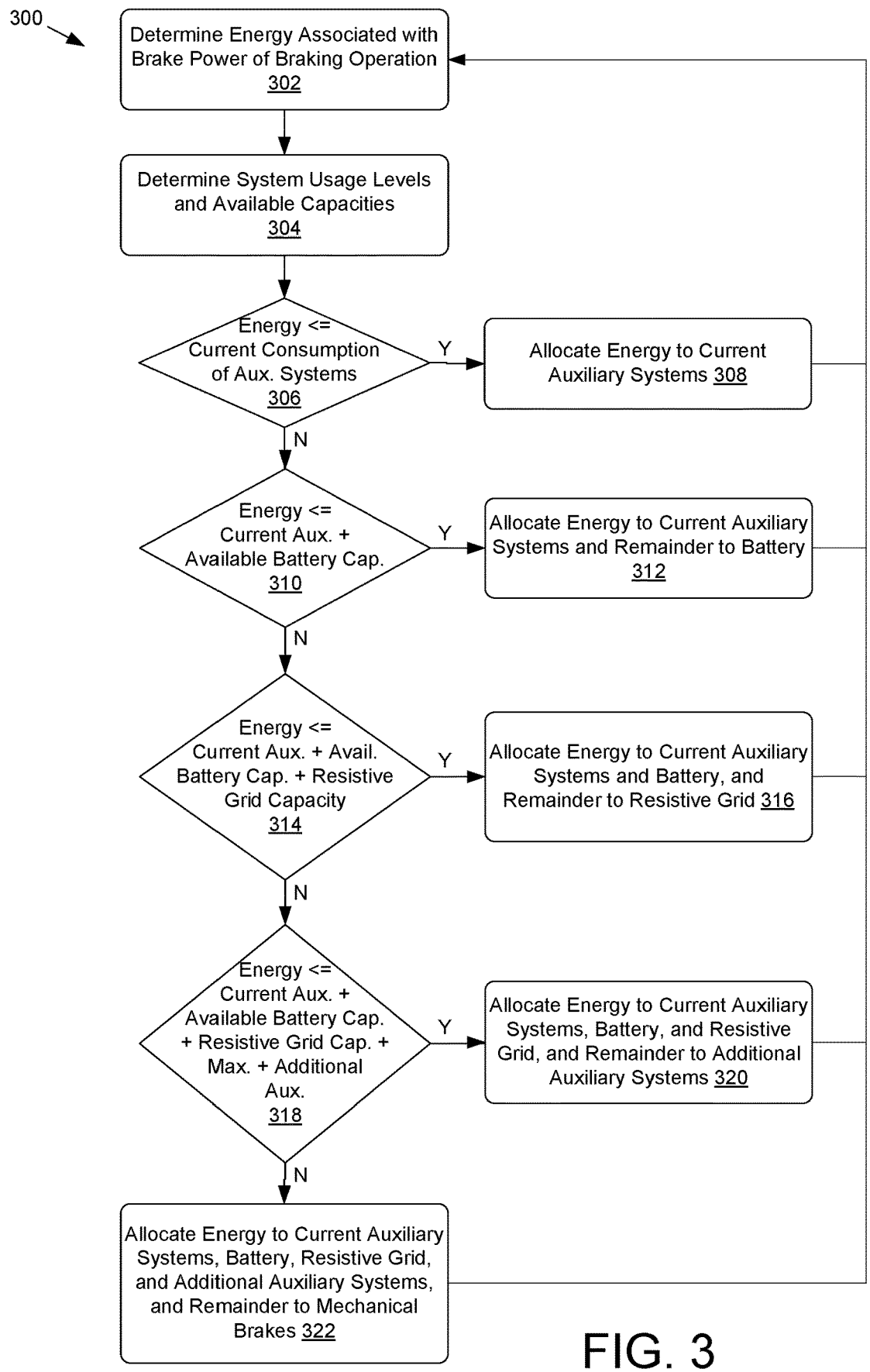
FIG. 3 shows a flowchart illustrating an example process for determining which systems of the machine to invoke during a braking operation.

FIG. 3 shows a flowchart 300 illustrating an example process for determining which systems of the machine 102 to invoke during a braking operation. The operations shown in FIG. 3 can be performed by a system that includes the braking operation determiner 134, the system selector 144, and/or other elements of the brake controller 120. An example architecture of a computing system associated with the brake controller 120 is shown in FIG. 4, and is described below with respect to that figure.

In the example process shown in FIG. 3, the system priority data 146 can indicate that using energy associated with the brake power to power currently-active auxiliary systems 118 is the highest priority, using energy associated with the brake power to charge the battery system 114 is the second-highest priority, consuming energy associated with the brake power via the resistive brake system 108 is the third-highest priority, using additional auxiliary systems 118 as parasitic systems to draw additional energy associated with the brake power is the fourth-highest priority, and using the mechanical brake system 110 is the lowest priority. The process shown in FIG. 3 is a non-limiting example, as in other examples the system priority data 146 can indicate a different priority order of these systems and/or other systems, as discussed further below.

At block 302, the brake controller 120 can determine an amount of energy associated with brake power of a braking operation. For example, the brake controller 120 can use the operations described above with respect to block 202, block 206, and block 208 of FIG. 2 to identify the braking operation, to determine the amount of brake power associated with the braking operation, and/or to determine the amount of energy associated with the amount of brake power. As discussed above, the amount of brake power associated with the braking operation can be, or correspond with, an amount of torque that would be used to implement the braking operation and/or an amount of energy that could be potentially be captured by the regenerative brake system 106 and/or the resistive brake system 108 during implementation of the braking operation.

At block 304, the brake controller 120 can determine current usage levels, currently-available capacities, and/or other attributes of systems of the machine 102. For example, the brake controller 120 can use operations described above with respect to block 210, block 212, block 214, and block 216 of FIG. 2 to determine, based on system feedback data received at block 204 of FIG. 2, current usage levels, currently-available capacities, and/or other attributes of the auxiliary systems 118, the battery system 114, the resistive brake system 108, and/or other systems.

At block 306, the brake controller 120 can determine whether an amount of energy associated with the brake power of the braking operation is less than or equal to a current amount of energy being drawn by the auxiliary systems 118. For example, active HVAC systems, lights, a radio, accessories, and/or other auxiliary systems 118 may currently be active and be drawing energy. If the amount of energy associated with the brake power of the braking operation is less than or equal to the current amount of energy being drawn by the auxiliary systems 118 (Block 306—Yes), the brake controller 120 can determine at block 308 that the energy associated with the brake power of the braking operation is to be provided directly to the currently-active auxiliary systems 118. For example, energy captured by the regenerative brake system 106 during the braking operation can be provided directly to one or more of the currently-active auxiliary systems 118, such that the currently-active auxiliary systems 118 can be at least partially powered by the captured energy instead of, or in addition to, energy from the battery system 114.

When the braking operation occurs and the brake power is generated, the brake controller 120 can accordingly cause energy associated with the brake power to be provided to the currently-active auxiliary systems 118. The brake controller 120 can also return to block 302 after block 308 to repeat the process of FIG. 3 for a subsequent braking operation. The brake controller 120 can determine new or different usage levels, available capacities, and/or other attributes of one or more systems during a subsequent loop through FIG. 3, for instance based on an amount of energy associated with brake power provided to the currently-active auxiliary systems 118 when the braking operation occurs.

If the amount of energy associated with the brake power of the braking operation is more than the current amount of energy being drawn by the auxiliary systems 118 (Block 306—No), the brake controller 120 can move to block 310. At block 310, the brake controller 120 can determine whether the amount of energy associated with the brake power is less than or equal to a first sum of the current amount of energy being drawn by the auxiliary systems 118 and the currently-available capacity of the battery system 114.

If the amount of energy associated with the brake power is less than or equal to the first sum (Block 310—Yes), the brake controller 120 can determine at block 312 that the energy associated with the brake power of the braking operation is to be allocated to the currently-active auxiliary systems 118, with a remainder of the energy being allocated to the battery system 114. For example, the brake controller 120 can determine that a first portion of the energy associated with the brake power, corresponding to the current amount of energy being drawn by the currently-active auxiliary systems 118, is to be provided directly to the currently-active auxiliary systems 118. Any additional energy beyond the first portion of the energy can be provided to the battery system 114 to charge the batteries 132. In this situation, the additional energy can be less than or equal to the currently-available capacity of the battery system 114, such that the additional energy can be used to charge the batteries 132.

When the braking operation occurs and the brake power is generated, the brake controller 120 can accordingly cause the first portion of the energy associated with the brake power to be provided to the currently-active auxiliary systems 118, and cause any remaining energy to be used to charge the battery system 114. The brake controller 120 can also return to block 302 after block 312 to repeat the process of FIG. 3 for a subsequent braking operation. The brake controller 120 can determine new or different usage levels, available capacities, and/or other attributes of one or more systems during a subsequent loop through FIG. 3, for instance based on the first portion of the energy associated with the brake power provided to the currently-active auxiliary systems 118, and/or updated SoC and available capacity values associated with the battery system 114 that have changed based on the additional energy beyond the first portion of energy.

If the amount of energy associated with the brake power of the braking operation is more than the first sum (Block 310—No), the brake controller 120 can move to block 314. At block 314, the brake controller 120 can determine whether the amount of energy associated with the brake power is less than or equal to a second sum of the current amount of energy being drawn by the auxiliary systems 118, the currently-available capacity of the battery system 114, and the currently-available capacity of the resistive grid of the resistive brake system 108.

If the amount of energy associated with the brake power is less than or equal to the second sum (Block 314—Yes), the brake controller 120 can determine at block 316 that the energy associated with the brake power of the braking operation is to be allocated to the currently-active auxiliary systems 118 and to the battery system 114, with a remainder of the energy being allocated to the resistive grid of the resistive brake system 108. For example, the brake controller 120 can determine that a first portion of the energy associated with the brake power, corresponding to the current amount of energy being drawn by the currently-active auxiliary systems 118, is to be provided directly to the currently-active auxiliary, systems 118. The brake controller 120 can also determine that a second portion of the energy associated with the brake power, corresponding to the currently-available capacity of the battery system 114, is to be provided to the battery system 114 to charge the batteries 132. Any additional energy beyond the first portion and the second portion of the energy associated with the brake power can be captured by the resistive brake system 108 and/or consumed by the resistive grid of the resistive brake system 108. In this situation, the additional energy can be less than or equal to the currently-available capacity of the resistive grid, such that the additional energy can be converted into heat by the resistive grid.

When the braking operation occurs and the brake power is generated, the brake controller 120 can accordingly cause the first portion of the energy associated with the brake power to be provided to the currently-active auxiliary systems 118, and cause the second portion of the energy associated with the brake power to be provided to the battery system 114. The brake controller 120 can also cause the resistive grid of the resistive brake system 108 to receive and consume any remaining energy beyond the first portion and the second portion of the energy.

In some examples, the notification manager 148 can also cause a notification to be displayed, via the user interface 130, informing a driver or other operator that at least some of the energy associated with the brake power is not being used to power auxiliary systems 118 or charge the battery system 114 in situations in which the amount of energy associated with the brake power is above the first sum. The notification can include a user-selectable option to impose speed limits 142, or the speed controller 128 and/or the brake controller 120 can automatically impose speed limits 142, in situations in which the amount of energy associated with the brake power is above the first sum. The speed limits 142 can automatically reduce or limit future speeds of the machine 102. Accordingly, subsequent braking operations that further decelerate the machine 102 from already-reduced speeds can be associated with lower deceleration rates, and thus lower amounts of energy associated with brake power that may be more likely to be fully used by the currently-active auxiliary systems 118 and/or to charge the battery system 114. Enforcement of the speed limits 142 can thereby reduce or eliminate the likelihood of additional energy, beyond portions of the energy associated with the brake power received by higher-priority systems, going to the resistive grid in association with subsequent braking operations.

The brake controller 120 can also return to block 302 after block 316 to repeat the process of FIG. 3 for a subsequent braking operation. The brake controller 120 can determine new or different usage levels, available capacities, and/or other attributes of one or more systems during a subsequent loop through FIG. 3, for instance based on the first portion of energy associated with the brake power provided to the currently-active auxiliary systems 118, the second portion of energy associated with the brake power provided to the battery system 114, and/or updated available capacity values associated with the resistive grid that have changed based on the additional energy beyond the first and second portions of energy associated with the brake power.

If the amount of energy associated with the brake power of the braking operation is more than the second sum (Block 314—No), the brake controller 120 can move to block 318. At block 318, the brake controller 120 can determine whether the amount of energy associated with the brake power is less than or equal to a third sum of the current amount of energy being drawn by the auxiliary systems 118, the currently-available capacity of the battery system 114, the currently-available capacity of the resistive grid of the resistive brake system 108, and a currently-available capacity of the auxiliary systems 118 to draw additional energy as parasitic systems.

If the amount of energy associated with the brake power is less than or equal to the third sum (Block 318—Yes), the brake controller 120 can determine at block 320 that the energy associated with the brake power of the braking operation is to be allocated to the currently-active auxiliary systems 118, to the battery system 114, and to the resistive grid, with a remainder of the energy being allocated to additional auxiliary systems 118 that can be activated as parasitic systems. For example, the brake controller 120 can determine that a first portion of the energy associated with the brake power, corresponding to the current amount of energy being drawn by the currently-active auxiliary systems 118, is to be provided directly to the currently-active auxiliary systems 118. The brake controller 120 can determine that a second portion of the energy associated with the brake power, corresponding to the currently-available capacity of the battery system 114, is to be provided to the battery system 114 to charge the batteries 132. The brake controller 120 can determine that a third portion of the energy associated with the brake power, corresponding to the currently-available capacity of the resistive grid, is to be provided to the resistive grid of the resistive brake system 108. Any additional energy beyond the first portion, the second portion, and the third portion of the energy associated with the brake power can be used to activate and power additional auxiliary systems 118 as parasitic systems. For example, one or more auxiliary systems 118 can be activated in order to draw the additional energy, and/or operations of one or more currently-active auxiliary systems 118 can be adjusted to draw the additional energy. In this situation, the additional energy can be less than or equal to the currently-available capacity of the auxiliary systems 118 to draw additional energy as parasitic systems.

When the braking operation occurs and the brake power is generated, the brake controller 120 can accordingly cause the first portion of the energy associated with the brake power to be provided to the currently-active auxiliary systems 118, cause the second portion of the energy associated with the brake power to be provided to the battery system 114, and cause the third portion of the energy associated with the brake power to be provided to the resistive grid of the resistive brake system 108. The brake controller 120 can also cause the machine 102 to activate additional auxiliary systems 118 as parasitic systems, and/or adjust currently-active auxiliary systems 118 to draw additional energy, to cause the auxiliary systems 118 to draw any remaining energy beyond the first portion, the second portion, and the third portion of the energy associated with the brake power.

In some examples, the notification manager 148 can also cause a notification to be displayed, via the user interface 130, informing a driver or other operator that at least some of the energy associated with the brake power is not being used to power auxiliary systems 118 or charge the battery system 114 in situations in which the amount of energy associated with the brake power is above the second sum. The notification can include a user-selectable option to impose speed limits 142, or the speed controller 128 and/or the brake controller 120 can automatically impose speed limits 142, in situations in which the amount of energy associated with the brake power is above the second sum. The speed limits 142 can be the same or different from speed limits 142 that may be imposed if the energy associated with the brake power is above the first sum. Enforcement of the speed limits 142 can reduce or eliminate the likelihood of additional energy, beyond portions of the energy associated with the brake power received by higher-priority systems, being received by auxiliary systems 118 acting as parasitic systems in association with subsequent braking operations.

The brake controller 120 can also return to block 302 after block 320 to repeat the process of FIG. 3 for a subsequent braking operation. The brake controller 120 can determine new or different usage levels, available capacities, and/or other attributes of one or more systems during a subsequent loop through FIG. 3, for instance based on the first portion of energy associated with the brake power provided to the currently-active auxiliary systems 118, the second portion of energy associated with the brake power provided to the battery system 114, the third portion of energy associated with the brake power provided to the resistive grid, and/or updated usage levels and available capacity values associated with the auxiliary systems 118 that have changed based on the additional energy beyond the first, second, and third portions of energy associated with the brake power.

If the amount of energy associated with the brake power of the braking operation is more than the third sum (Block 318—No), the brake controller 120 can determine that current usage levels and/or currently-available capacities of the higher-priority systems, including the currently-active auxiliary systems 118, the battery system 114, the resistive grid, and additional auxiliary systems 118 that could be activated as parasitic systems, are unable to receive, store, and/or consume all of the energy associated with the brake power. The brake controller 120 can accordingly determine at block 322 that a remainder of the energy associated with the brake power, beyond portions of the energy that can be received, stored, and/or re-used by the higher-priority systems, can be allocated to the lowest-priority mechanical brake system 110.

For example, the brake controller 120 can determine that a first portion of the energy associated with the brake power, corresponding to the current amount of energy being drawn by the currently-active auxiliary systems 118, is to be provided directly to the currently-active auxiliary systems 118. The brake controller 120 can determine that a second portion of the energy associated with the brake power, corresponding to the currently-available capacity of the battery system 114, is to be provided to the battery system 114 to charge the batteries 132. The brake controller 120 can determine that a third portion of the energy associated with the brake power, corresponding to the currently-available capacity of the resistive grid, is to be provided to the resistive grid of the resistive brake system 108. The brake controller 120 can determine that a fourth portion of the energy associated with the brake power, corresponding to a currently-available capacity of the auxiliary systems 118 to draw additional energy as parasitic systems, is to be additionally provided to the auxiliary systems 118. Any additional energy beyond the first portion, the second portion, the third portion, and the fourth portion of the energy associated with the brake power can be allocated to the mechanical brake system 110.

When the braking operation occurs and the brake power is generated, the brake controller 120 can accordingly cause the first portion of the energy associated with the brake power to be provided to the currently-active auxiliary systems 118, cause the second portion of the energy associated with the brake power to be provided to the battery system 114, cause the third portion of the energy associated with the brake power to be provided to the resistive grid of the resistive brake system 108, and cause the fourth portion of the energy associated with the brake power to be drawn by auxiliary systems 118 acting as parasitic systems. The brake controller 120 can also the mechanical brake system 110 to use or consume the remainder of the energy associated with the brake power during the braking operation.

In this situation, use of the mechanical brake system 110 can apply friction to brake pads, can put strain on other components of the mechanical brake system 110, can generate heat, and/or otherwise potentially reduce the remaining usable life of the mechanical brake system 110. The notification manager 148 can be configured to cause a corresponding notification to be displayed, via the user interface 130, informing a driver or other operator that the mechanical brake system 110 is being used. The notification may suggest that the driver reduce a speed of the machine 102 to reduce the likelihood of the mechanical brake system 110 being used during subsequent braking operations. The notification may also indicate a temperature of the mechanical brake system 110, based on temperature information measured and provided by the brake temperature sensors 124. If the temperature of the mechanical brake system 110 exceeds a threshold temperature value, the notification may indicate a level of urgency noting that temperatures of the mechanical brake system 110 are exceeding optimal limits, and that the driver should prioritize taking steps to reduce the chances of the mechanical brake system 110 being used during subsequent braking operations. The notification, or a separate notification, may also indicate that at least some of the energy associated with the brake power is not being used to power auxiliary systems 118 or charge the battery system 114.

As with other notifications discussed above, a notification displayed when the mechanical brake system 110 is used can include a user-selectable option to impose speed limits 142, or the speed controller 128 and/or the brake controller 120 can automatically impose speed limits 142. The speed limits 142 that may be enforced based on usage of the mechanical brake system 110 can be the same or different from speed limits 142 that may be imposed if the energy associated with the brake power is above the first sum or is above the second sum. Enforcement of the speed limits 142 can reduce or eliminate the likelihood of additional energy, beyond portions of the energy associated with the brake power received by higher-priority systems, being allocated to the lowest-priority mechanical brake system 110.

The brake controller 120 can also return to block 302 after block 322 to repeat the process of FIG. 3 for a subsequent braking operation. The brake controller 120 can determine new or different usage levels, available capacities, and/or other attributes of one or more systems during a subsequent loop through FIG. 3, for instance based on the first portion of energy associated with the brake power provided to the currently-active auxiliary systems 118, the second portion of energy associated with the brake power provided to the battery system 114, the third portion of energy associated with the brake power provided to the resistive grid, the fourth portion of energy drawn by auxiliary systems 118 acting as parasitic systems, and/or updated usage levels, temperatures, and other attributes of the mechanical brake system 110 that have changed based on the additional energy beyond the first, second, third, and fourth portions of energy associated with the brake power.

As discussed above, the brake controller 120 can return to block 302 after block 308, block 312, block 316, block 320, or block 322, to initiate a subsequent loop through FIG. 3 for a subsequent braking operation. In some examples, the subsequent braking operation can be a continuation of the previous braking operation. For instance, a driver may have depressed a brake pedal further, relative to a previous position of the brake pedal, such that updated brake input 136 indicates a command to decelerate the machine 102 at an increased deceleration rate. The brake controller 120 can also determine updated usage levels, updated available capacities, and/or other updated attributes of systems of the machine 102 at block 304, for instance based on which systems were invoked for previous and/or current braking operations and corresponding portions of energy associated with the brake power allocated to those systems. Accordingly, the brake controller 120 can continually loop through the process of FIG. 3 to dynamically adjust which systems are invoked for braking operations, and how much energy associated with the brake power is allocated to those systems, as conditions associated with the machine 102 change.

The process shown in FIG. 3 is a non-limiting example in which the system priority data 146 indicates that currently-active auxiliary systems 118 have the highest priority, the battery system 114 has the second-highest priority, the resistive brake system 110 has the third-highest priority, additional auxiliary systems 118 acting as parasitic systems have the fourth-highest priority, and the mechanical brake system 110 has the lowest priority. However, the system priority data 146 can indicate a different priority order of these systems and/or other systems. Accordingly, the brake controller 120 can determine to apply portions of energy associated with the brake power and/or remaining energy associated with the brake power among systems in a different order, based on a priority order indicated by the system priority data 146. For example, if the system priority data 146 indicates that the battery system 114 has the highest priority, the brake controller 120 can prioritize applying energy associated with the brake power, up to a currently-available capacity of the battery system 114, to the battery system 114. If any additional energy associated with the brake power is available, the brake controller 120 can prioritize applying the additional energy associated with the brake power to one or more lower-priority systems, such as the auxiliary systems 118 and/or the resistive brake system 108, based on the system priority, data 146. If still more energy associated with the brake power is available beyond energy allocated in a priority order to the highest-priority systems, such as the battery system 114, the auxiliary systems 118, and/or the resistive brake system 108, and the mechanical brake system 110 is the lowest-priority system, the brake controller 120 can apply the remaining energy to the lowest-priority mechanical brake system 110, FIG. 4 shows an example system architecture for a computing system 400 associated with the machine 102. The computing system 400 can include one or more computing devices or other controllers that include one or more processors 402, memory 404, and/or communication interfaces 406.

The computing system 400 can be, or include, the brake control system 100 including the brake controller 120 and/or speed controller 128 described above. In some examples, the computing system 400 can be an ECM or other on-board computing system of the machine 102. In some examples, elements of the brake control system 100 can be distributed among multiple computing systems similar to the computing system 400 shown in FIG. 1. For instance, the brake controller 120 can be implemented by a first computing system, while the speed controller 128 can be implemented by a second computing system.

The processor(s) 402 can operate to perform a variety of functions as set forth herein. The processor(s) 402 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 402 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 402 can also access content and computer-executable instructions stored in the memory 404, and execute such computer-executable instructions.

The memory 404 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 402 to perform the operations described herein.

For example, the memory 404 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 402 and/or communication interface(s) 406 during execution thereof by the computing system 400. For example, the processor(s) 402 can possess local memory, which also can store program modules, program data, and/or one or more operating systems.

In some examples, the memory 404 can store the braking operation determiner 134, the site map 140, the speed limits 142, the system priority data 146, the system selector 144, and/or the notification manager 148 described above. The memory 404 can also store other modules and data 408 that can be utilized by the computing system 400 to perform or enable performing any action taken by the computing system 400. For example, the other modules and data 408 can include a platform, operating system, and/or applications, as well as data utilized by the platform, operating system, and/or applications.

The communication interfaces 406 can include transceivers, modems, interfaces, antennas, and/or other components that can transmit and/or receive data over networks or other data connections. In some examples, the communication interfaces 406 can be wireless communication interfaces of the machine 102, through which the machine 102 can report location data to off-board computing systems, receive autonomous machine commands, and/or otherwise exchange data with off-board computing systems. The communication interfaces 406 can also enable the computing system 400 to exchange data with other computing devices on-board the machine 102.

INDUSTRIAL APPLICABILITY

As described above, the brake controller 120 can identify a braking operation of the machine 102, and can determine an amount of brake power associated with the braking operation. The brake controller 120 can also determine which systems of the machine 102 to invoke during the braking operation, and how much of the energy associated with the brake power to allocate to those systems. For example, the brake controller 120 can select one or more of the brake systems 104 to invoke during a braking operation. The brake controller 120 can also determine portions of the energy associated with the brake power to be allocated to the selected brake systems 104, to the battery system 114, and/or to one or more of the auxiliary systems 118.

The brake controller 120 can be configured to select the systems to invoke during a brake operation based at least in part on a priority order of the systems indicated by the system priority data 146, as well as based on usage levels, available capacities, and/or other attributes of the systems. For example, the system priority data 146 can indicate that, during a braking operation, invoking the regenerative brake system 106 to charge the battery system, invoking the resistive grid of the resistive brake system 108 to consume energy associated with the brake power, and/or invoking currently-active auxiliary systems 118 and/or additional auxiliary systems 118 to draw energy associated with the brake power are higher priorities than invoking the mechanical brake system 110. The system priority data 146 can, overall, prioritize usage of systems that can store and/or re-use energy over other systems that convert the energy to heat and/or otherwise waste the energy.

The brake controller 120 can cause the machine 102 to use, during a braking operation, one or more systems that are higher priorities than the mechanical brake system 110. Accordingly, usage of the mechanical brake system 110 can be avoided during braking operations, unless available capacities of multiple higher-priority systems are insufficient to receive energy associated with the brake power associated with the braking operations.

Even if the mechanical brake system 110 is invoked for a braking operation, portions of energy associated with the brake power of that braking operation can be allocated to other higher-priority systems, up to the available capacities of those higher-priority systems to receive the energy associated with the brake power. Accordingly, those portions of the energy associated with the brake power can be used to charge the battery system 114, to power auxiliary systems 118, or be consumed by the resistive grid of the resistive brake system 108, such that only a remainder of the energy associated with the brake power is allocated to the mechanical brake system 110.

Overall, the system priority data 146 can cause the brake controller 120 to prioritize allocating energy associated with the brake power to systems that can store and/or re-use the energy most efficiently. For example, by prioritizing use of the regenerative brake system 106 to charge the battery system 114, the machine 102 can operate for longer periods between visits to a stationary charging station to charge the battery system 114. This can allow the machine 102 to perform more work on a worksite or other location by reducing time spent at stationary charging stations, and allow the battery system 114 to be charged more often using energy captured by the regenerative brake system 106 than using energy received from a utility company or other outside source.

As another example, by prioritizing use of the resistive brake system 108 over the mechanical brake system 110, portions of energy associated with the brake power can be converted to heat in a resistive grid instead of being allocated to the mechanical brake system 110. Accordingly, although the energy associated with the brake power consumed by the resistive grid may not be re-used, avoiding allocation of that energy to the mechanical brake system 110 can prevent the mechanical brake system 110 from wearing down brake pads or other elements of the mechanical brake system 110.

By prioritizing the use of multiple other systems during braking operations over use of the mechanical brake system 110, the overall usage level of the mechanical brake system 110 can be reduced or minimized. In situations in which the mechanical brake system 110 is invoked for braking operations, the notification manager 148 can present notifications to an operator indicating that the operator is exceeding an energy-capturing mode of the machine 102 and/or suggesting actions that may reduce the likelihood of the mechanical brake system 110 continuing to be used for subsequent braking operations. Similarly, user-selected or automatic speed limits 142 can control a speed of the machine 102 to reduce the likelihood of the mechanical brake system 110 continuing to be used for subsequent braking operations. Accordingly, by reducing the frequency of braking operations in which the mechanical brake system 110 is invoked, temperatures associated with the mechanical brake system 110 can be lowered, the usable life of brake pads and other elements of the mechanical brake system 110 can be extended, and/or the machine 102 can be subject to maintenance associated with the mechanical brake system 110 less frequently.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof

What is claimed is:

1. A computer-implemented method, comprising:
    identifying, by one or more processors, a braking operation to be performed by a machine, wherein the machine comprises:
        a regenerative brake system; and
        a plurality of systems comprising:
            at least one additional brake system;
            a battery system; and
            a plurality of auxiliary systems;
    determining, by the one or more processors, brake power of the braking operation based on an estimated level of torque that will be used during implementation of the braking operation;
    determining, by the one or more processors, a particular amount of energy, corresponding to the brake power, available to be captured by the regenerative brake system during the braking operation;
    determining, by the one or more processors, available capacities of individual systems, of the plurality of systems, to receive at least a portion of the particular amount of energy;
    determining, by the one or more processors, a priority order of the individual systems based on system priority data, wherein the priority order indicates that systems configured to store or re-use energy are higher priorities than other systems that are not configured to store or re-use energy;
    allocating, by the one or more processors, one or more portions of the particular amount of energy to one or more systems of the plurality of systems in the priority order, wherein the one or more portions are based on the available capacities of the one or more systems; and
    invoking, by the one or more processors, the regenerative brake system and the one or more systems during the braking operation.

2. The computer-implemented method of claim 1, wherein allocating the one or more portions of the particular amount of energy comprises:
    allocating, by the one or more processors, at least one portion of the particular amount of energy to at least one system, of the plurality of systems, that the system priority data indicates is a higher priority than a lower priority system; and
    allocating, by the one or more processors, a remainder of the particular amount of energy, beyond the at least one portion, to the lower priority system.

3. The computer-implemented method of claim 2, further comprising:
    adjusting, by the one or more processors, automatically or based on selection of a user-selectable option in response to allocation of the remainder of the particular amount of energy to the lower priority system, a speed limit associated with the machine,
    wherein adjusting the speed limit is configured to;
        reduce a second amount of energy associated with a subsequent braking operation, and
        reduce a likelihood of a portion of the second amount of energy being allocated to the lower priority system in association with the subsequent braking operation.

4. The computer-implemented method of claim 1, wherein the plurality of auxiliary systems comprises:
    one or more currently-active auxiliary systems configured to draw energy from at least one of the battery system or the regenerative brake system; and
    one or more additional auxiliary systems configured to be activated as parasitic systems to receive and consume energy captured by the regenerative brake system.

5. The computer-implemented method of claim 1, wherein:
    the at least one additional brake system comprises a resistive brake system,
    the regenerative brake system and the resistive brake system are both invoked during the braking operation, and allocating the one or more portions of the particular amount of energy comprises:
  determining, by the one or more processors, that the battery system has a higher priority than the resistive brake system;
  allocating, by the one or more processors, a first portion of the particular amount of energy to the battery system, wherein the first portion corresponds with a first available capacity of the battery system; and
  allocating, by the one or more processors, a remainder of the particular amount of energy, beyond the first portion, to the resistive brake system.

6. The computer-implemented method of claim 1, wherein:
the at least one additional brake system comprises:
  a resistive brake system comprising a resistive grid; and
  a mechanical brake system, and
allocating the one or more portions of the particular amount of energy comprises:
  determining, by the one or more processors, that the battery system has a higher priority than the resistive brake system, and that the mechanical brake system has a lowest priority;
  allocating, by the one or more processors, a first portion of the particular amount of energy to the battery system, wherein the first portion corresponds with a first available capacity of the battery system;
  allocating, by the one or more processors, a second portion of the particular amount of energy to the resistive brake system, wherein the second portion corresponds with a second available capacity of the resistive grid of the resistive brake system; and
  allocating, by the one or more processors, a remainder of the particular amount of energy, beyond the first portion and the second portion, to the mechanical brake system, by invoking the mechanical brake system during the braking operation in addition to the regenerative brake system and the resistive brake system.

7. The computer-implemented method of claim 1, further comprising:
  determining, by the one or more processors, that at least some of the particular amount of energy is being allocated to one or more of the other systems that are not configured to store or re-use energy; and
  causing, by the one or more processors, display of a notification via a user interface of the machine, wherein the notification indicates that the at least some of the particular amount of energy is being allocated to the one or more of the other systems that are not configured to store or re-use energy.

8. The computer-implemented method of claim 7, wherein:
  the one or more of the other systems that are not configured to store or re-use energy comprises a mechanical brake system, and
  the notification indicates that a temperature of the mechanical brake system, provided by a brake temperature sensor associated with the mechanical brake system, exceeds a threshold temperature.

9. The computer-implemented method of claim 1, wherein the braking operation is identified based on one or more of:
  user-provided brake input,
  speed data indicating one or more of a current speed of the machine, speed limits, or autonomous speed commands, or
  a site map indicating grades of terrain.

10. The computer-implemented method of claim 9, wherein:
  the braking operation is an automatically-scheduled preemptive braking operation to decelerate the machine before the machine reaches a downhill section indicated by the site map, and
  deceleration of the machine during the automatically-scheduled preemptive braking operation reduces a second amount of energy associated with second brake power of a subsequent braking operation associated with travel through the downhill section.

11. A brake controller of a machine, comprising:
one or more processors; and
memory storing computer-executable instructions that, when executed by the one or more processors, cause the one or more processors to perform operations comprising:
  identifying a braking operation to be performed by the machine, wherein the machine comprises:
    a regenerative brake system; and
    a plurality of systems comprising:
      at least one additional brake system;
      a battery system; and
      a plurality of auxiliary systems;
  determining brake power of the braking operation, based on an estimated level of torque that will be used during implementation of the braking operation;
  determining a particular amount of energy, corresponding to the brake power, available to be captured by the regenerative brake system during the braking operation;
  determining available capacities of individual systems, of the plurality of systems, to receive at least a portion of the particular amount of energy;
  determining a priority order of the individual systems based on system priority data, wherein the priority order indicates that systems configured to store or re-use energy are higher priorities than other systems that are not configured to store or re-use energy;
  allocating one or more portions of the particular amount of energy to one or more systems of the plurality of systems in the priority order, wherein the one or more portions are based on the available capacities of the one or more systems; and
  invoking the regenerative brake system and the one or more systems during the braking operation.

12. The brake controller of claim 11, wherein allocating the one or more portions of the particular amount of energy comprises:
  allocating portions of the particular amount of energy to at least two systems, of the plurality of systems, that the system priority data indicates are higher priorities than a lower priority system; and
  allocating a remainder of the particular amount of energy, beyond the portions allocated to the at least two systems, to the lower priority system.

13. The brake controller of claim 12, wherein;
the at least one additional brake system comprises a mechanical brake system, and
the mechanical brake system is the lower priority system.

14. The brake controller of claim 12, wherein the operations further comprise:
  adjusting, automatically or based on selection of a user-selectable option in response to allocation of the remainder of the particular amount of energy to the lower priority system, a speed limit associated with the machine, wherein adjusting the speed limit is configured to:
   reduce a second amount of energy associated with second brake power of a subsequent braking operation, and
   reduce a likelihood of a portion of the second amount of energy being allocated to the lower priority system in association with the subsequent braking operation.

15. A machine comprising:
a regenerative brake system;
a plurality of systems comprising:
   a battery system;
   one or more auxiliary systems;
   a resistive brake system comprising a resistive grid configured to convert energy into heat; and
   a mechanical brake system; and
a brake controller configured to:
   identify a braking operation to be performed by the machine;
   determine brake power, of the braking operation, based on an estimated level of torque that will be used during implementation of the braking operation;
   determine a particular amount of energy, corresponding to the brake power, available to be captured by the regenerative brake system during the braking operation;
   determine available capacities of individual systems, of the plurality of systems, to receive at least a portion of the particular amount of energy;
   determine a priority order of the individual systems, based on system priority data, wherein the priority order indicates that the mechanical brake system is a lower priority than the battery system, the one or more auxiliary systems, and the resistive brake system;
   allocate one or more portions of the particular amount of energy to one or more systems of the plurality of systems in the priority order, wherein the one or more portions are based on the available capacities of the one or more systems; and
   invoke the regenerative brake system and the one or more systems during the braking operation.

16. The machine of claim 15, wherein:
the one or more auxiliary systems comprises:
   currently-active auxiliary systems configured to draw energy from at least one of the battery system or the regenerative brake system; and
   additional auxiliary systems configured to be activated as parasitic systems to consume energy captured by the regenerative brake system,
the priority order indicates first priorities of the currently-active auxiliary systems and the additional auxiliary systems, relative to second priorities of the battery system, the resistive brake system, and the mechanical brake system, and the brake controller is configured to allocate the one or more portions of the particular amount of energy to one or more of the currently-active auxiliary systems, the battery system, the resistive brake system, the additional auxiliary systems, or the mechanical brake system in the priority order.

17. The machine of claim 15, wherein allocating the one or more portions of the particular amount of energy comprises:
   allocating portions of the particular amount of energy to at least two systems, of the plurality of systems, that the priority order indicates are higher priorities than the mechanical brake system; and
   allocating a remainder of the particular amount of energy, beyond the portions allocated to the at least two systems, to the mechanical brake system by invoking the mechanical brake system during the braking operation in addition to the regenerative brake system.

18. The machine of claim 15, wherein the system priority data indicates that:
   one or more currently-active auxiliary systems, of the one or more auxiliary systems, have a highest priority,
   the battery system has a second-highest priority,
   the resistive brake system has a third-highest priority,
   one or more currently-inactive auxiliary systems, of the one or more auxiliary systems, have a fourth-highest priority, and
   the mechanical brake system has a lowest priority.

19. The computer-implemented method of claim 1, further comprising determining, by the one or more processors, the estimated level of torque that will be used during implementation of the braking operation based on at least one of:
   a weight of the machine,
   a current speed of the machine,
   a target speed of the machine,
   a target deceleration rate associated with the braking operation, or
   braking capabilities of one or more of the regenerative brake system or the at least one additional brake system.

20. The brake controller of claim 12, wherein:
the plurality of auxiliary systems comprises:
   one or more currently-active auxiliary systems; and
   one or more currently-inactive auxiliary systems;
the at least one additional brake system comprises one or more of:
   a resistive brake system, or
   a mechanical brake system,
the at least two systems, that are higher priorities than the lower priority system, are selected from among:
   the one or more currently-active auxiliary systems,
   the battery system, and
   the resistive brake system, and
the lower priority system is selected from among:
   the one or more currently-inactive auxiliary systems, and
   the mechanical brake system.

* * * * *